United States Patent
Calcev et al.

(10) Patent No.: US 9,232,361 B2
(45) Date of Patent: Jan. 5, 2016

(54) SYSTEM AND METHOD FOR DIRECT MULTI-USER TRANSMISSION

(75) Inventors: George Calcev, Hoffman Estates, IL (US); Osama Aboul-Magd, Kanata (CA); Bin Chen, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 71 days.

(21) Appl. No.: 13/614,170

(22) Filed: Sep. 13, 2012

(65) Prior Publication Data

US 2013/0064166 A1    Mar. 14, 2013

Related U.S. Application Data

(60) Provisional application No. 61/534,282, filed on Sep. 13, 2011.

(51) Int. Cl.
| | | |
|---|---|---|
| H04W 4/08 | (2009.01) | |
| H04L 12/28 | (2006.01) | |
| H04L 12/18 | (2006.01) | |
| H04W 76/02 | (2009.01) | |

(52) U.S. Cl.
CPC ............. *H04W 4/08* (2013.01); *H04L 12/189* (2013.01); *H04L 12/2838* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 8,451,771 B2* | 5/2013 | Hedayat et al. | ............... | 370/322 |
| 8,594,007 B2* | 11/2013 | Wentink | ........................ | 370/312 |
| 2004/0249977 A1* | 12/2004 | Minamisawa | ................ | 709/245 |
| 2006/0187964 A1* | 8/2006 | Li et al. | ......................... | 370/474 |
| 2006/0252443 A1* | 11/2006 | Sammour et al. | ............. | 455/518 |
| 2007/0189207 A1* | 8/2007 | Sammour et al. | ............. | 370/328 |
| 2007/0248117 A1* | 10/2007 | Zuniga et al. | ................. | 370/468 |
| 2008/0219228 A1* | 9/2008 | Seok et al. | .................... | 370/338 |
| 2009/0296619 A1* | 12/2009 | Sammour et al. | ............. | 370/311 |
| 2011/0110349 A1* | 5/2011 | Grandhi | ........................ | 370/338 |
| 2011/0149822 A1* | 6/2011 | Sammour et al. | ............. | 370/311 |

(Continued)

OTHER PUBLICATIONS

IEEE Standard for Information Technology—Telecommunications and information exchange between systems—Local and metropolitan area networks—Specific requirements, Part11: Wireless LAN Medium Access Control (MAC) and Physical Layer (PHY) Specifications, IEEE Draft P802.11-REVmb™/D.8.0, LAN/MAN Standards Committee of the IEEE Computer Society, 802.11 Working Group, Mar. 2011, 2,766 pages.

(Continued)

*Primary Examiner* — Chirag Shah
*Assistant Examiner* — Suk Jin Kang
(74) *Attorney, Agent, or Firm* — Slater & Matsil, LLP

(57) ABSTRACT

A method for transmitting to a plurality of responder stations includes transmitting a first direct link setup request message to a first responder station via an access point, the first direct link setup request message including a first group identifier, the first group identifier being received from a communications controller and being associated with the first responder station, and transmitting a second direct link setup request message to a second responder station via the access point, the second setup request message including a second group identifier, the second group identifier being received from the communications controller and being associated with the second responder station. The method also includes transmitting data to the first responder station and the second responder station in a single transmission.

31 Claims, 11 Drawing Sheets

(56) References Cited

U.S. PATENT DOCUMENTS

| | | | |
|---|---|---|---|
| 2011/0261708 A1* | 10/2011 | Grandhi | 370/252 |
| 2011/0317609 A1* | 12/2011 | Sammour et al. | 370/312 |
| 2012/0087300 A1* | 4/2012 | Seok | 370/315 |
| 2012/0106531 A1* | 5/2012 | Seok et al. | 370/338 |
| 2012/0275332 A1* | 11/2012 | Seok et al. | 370/252 |

OTHER PUBLICATIONS

"Draft Standard for Information Technology—Telecommunications and information exchange between systems—Local and metropolitan areal networks—Specifics, Part 11: Wireless LAN Medium Access Control (MAC) and Physical Layer (PHY) specifications, Amendment 5: Enhancements for Very High Throughput for Operation in Bands below 6 GHz," IEEE P802.11ac™/D1.0, 802.11 Working Group of the 802 Committee, May 2011, 263 pages.

International Search Report and Written Opinion of Patent Cooperation Treaty (PCT), International Application No. PCT/US12/55247, Applicant Huawei Technologies Co., Ltd., date of mailing Dec. 7, 2012, 8 pages.

IEEE Standard for Information Technology—Telecommunications and information exchange between systems—Local and metropolitan area networks—Specific requirements, Part 11: Wireless LAN Medium Access Control (MAC) and Physical Layer (PHY) Specifications, IEEE Draft P802.11-REVmb™/D8.0, Mar. 2011, IEEE Standards Activities Department, 2,766 pages.

Draft Standard for Information Technology—Telecommunications and information exchange between systems—Local and metropolitan area networks—Specific requirements, Part 11: Wireless LAN Medium Access Control (MAC) and Physical Layer (PHY) Specifications, IEEE P802.11ac™/D1.0, May 2011, IEEE Standards Activities Department, 263 pages.

* cited by examiner

SYSTEM AND METHOD FOR DIRECT MULTI-USER TRANSMISSION

This application claims the benefit of U.S. Provisional Application No. 61/534,282, filed on Sep. 13, 2011, entitled "System and Method for Multi-User Multiple-Input Multiple Output Communications in a Wireless Network," which application is hereby incorporated herein by reference.

TECHNICAL FIELD

The present disclosure relates generally to digital communications, and more particularly to a system and method for direct multi-user transmission.

BACKGROUND

Wi-Fi is a wireless standard for connecting electronic devices. Wi-Fi may also be known as IEEE 802.11. Generally, a Wi-Fi enabled device (also commonly referred to as a station), such as a personal computer, a tablet, a personal digital assistant, a video game console, a television, a smartphone, a digital media player, and the like may connect to a service provider when it is within range of a Wi-Fi network connected to the service provider. A typical access point (also commonly known as a hotspot) usually has a range on the order of 10 s of meters when indoors and a greater range outdoors. Multiple overlapping access points may be used to provide coverage over larger areas.

SUMMARY OF THE DISCLOSURE

Example embodiments of the present disclosure which provide a system and method for direct multi-user transmission.

In accordance with an example embodiment of the present disclosure, a method for method for transmitting to a plurality of responder stations is provided. The method includes transmitting a first direct link setup request message to a first responder station via an access point, the first direct link setup request message including a first group identifier, the first group identifier being received from a communications controller and being associated with the first responder station, and transmitting a second direct link setup request message to a second responder station via the access point, the second setup request message including a second group identifier, the second group identifier being received from the communications controller and being associated with the second responder station. The method also includes transmitting data to the first responder station and the second responder station in a single transmission, a first portion of the data intended for the first responder station labeled with the first group identifier and a second portion of the data intended for the second responder station labeled with the second group identifier.

In accordance with another example embodiment of the present disclosure, a method for method for operating an access point is provided. The method includes receiving, by the access point, a first group identifier request for a first responder station from an initiator station, and selecting, by the access point, a first group identifier for the first responder station. The method also includes transmitting, by the access point, the first group identifier to the initiator station, and receiving, by the access point, a second group identifier request for a second responder station from the initiator station. The method additionally includes selecting, by the access point, a second group identifier for the second responder station, and transmitting, by the access point, the second group identifier to the initiator station.

In accordance with another example embodiment of the present disclosure, an initiator station is provided. The initiator station includes a transmitter. The transmitter transmits a first direct link setup request message to a first responder station via an access point, the first direct link setup request message including a first group identifier, the first group identifier being received from a communications controller and being associated with the first responder station, transmits a second direct link setup request message to the second responder station via the access point, the second direct link setup request message including a second group identifier, the second group identifier being received from the communications controller and being associated with the second responder station, and transmits data to the first responder station and the second responder station, a first portion of the data intended for the first responder station labeled with the first group identifier and a second portion of the data intended for the second responder station labeled with the second group identifier.

In accordance with another example embodiment of the present disclosure, an access point is provided. The access point includes a receiver, a processor operatively coupled to the receiver, and a transmitter operatively coupled to the processor. The receiver receives a first group identifier request for a first responder station from an initiator station, and receives a second group identifier request for a second responder station from the initiator station. The processor selects a first group identifier for the first responder station, and selects a second group identifier for the second responder station. The transmitter transmits the first group identifier to the initiator station, and transmits the second group identifier to the initiator station.

One advantage of an embodiment is that a single station may directly transmit to multiple other stations without having to transit to an access point, which can reduce latency as well as resource utilization.

A further advantage of an embodiment is that a centralized technique for managing group identifier allocation allows for the management of group identifiers and/or positions through the use of a centralized management entity.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to direct multi-user transmission. For example, at an initiator station, the initiator station requests and receives a first group identifier for a first responder station from a communications controller, as well as requests and receives a second group identifier for a second responder station from the communications controller. Also, the initiator station transmits a first setup request message to the first responder station via an access point to configure the first responder station for direct link communications, and transmits a second setup request message to the second responder station via the access point to configure the second responder station for direct link communications. Additionally, the initiator station transmits data to the first responder station and the second responder station in a single transmission. As another example, at an access point, the access point receives a first group identifier request for a first responder station from an initiator station, selects a first group identifier for the first responder station, and transmits the first group identifier to the initiator station. The access point also receives a second group identifier request for a second responder station from the initiator station, selects a second group identifier for the second responder station, and transmits the second group identifier to the initiator station.

The present disclosure will be described with respect to example embodiments in a specific context, namely an IEEE 802.11 compliant communications system that supports multi-user communications. The disclosure may also be applied, however, to other standards compliant and non-standards compliant communications systems that support multi-user communications.

Figure 1A:
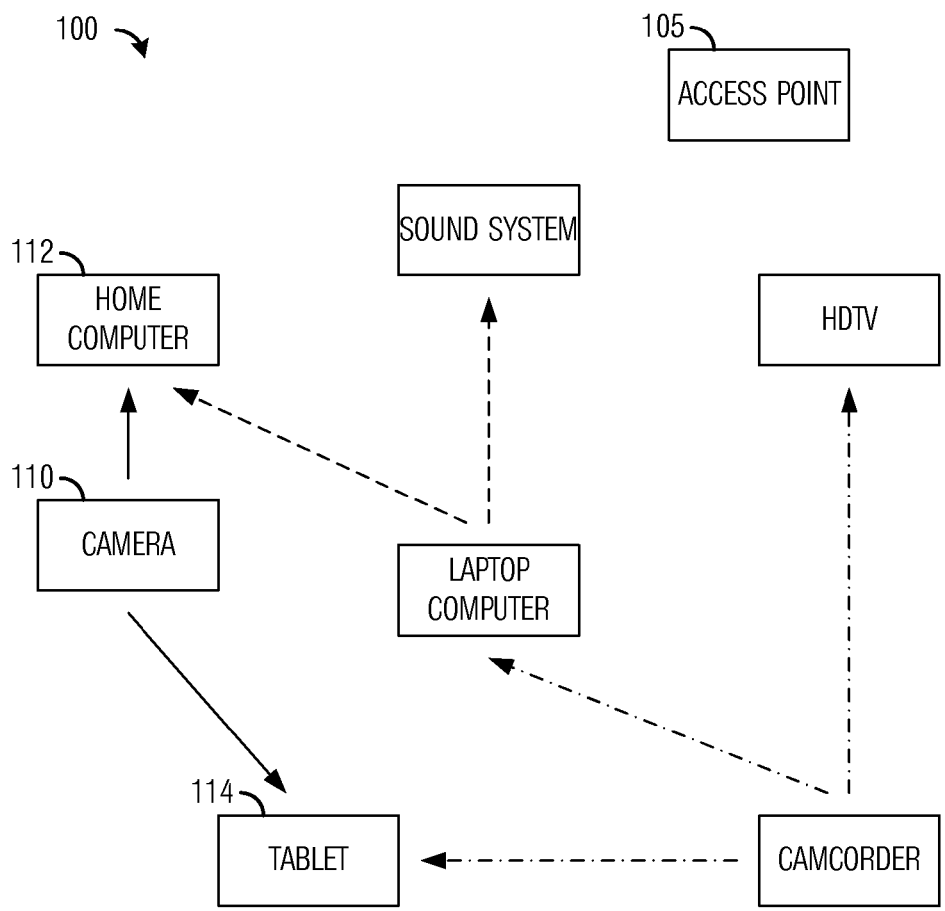
FIG. 1a illustrates an example first example communications system according to example embodiments described herein.

FIG. 1a illustrates a first example communications system 100. Communications system 100 may include a plurality of Wi-Fi enabled devices, also commonly referred to as stations or STA, that are capable of communicating with one another through an access point (AP) 105. Typically, a first station, such as a camera 110, may communicate with a second station, such as a home computer 112, and/or a third station, such as a tablet 114, by transmitting to AP 105, which in turn transmits to the second station or the third station. It may be said that the first station is communicating with the second station and/or the third station through AP 105. It is noted that the transmission to AP 105 and from AP 105 are not shown in FIG. 1a.

Figure 1B:
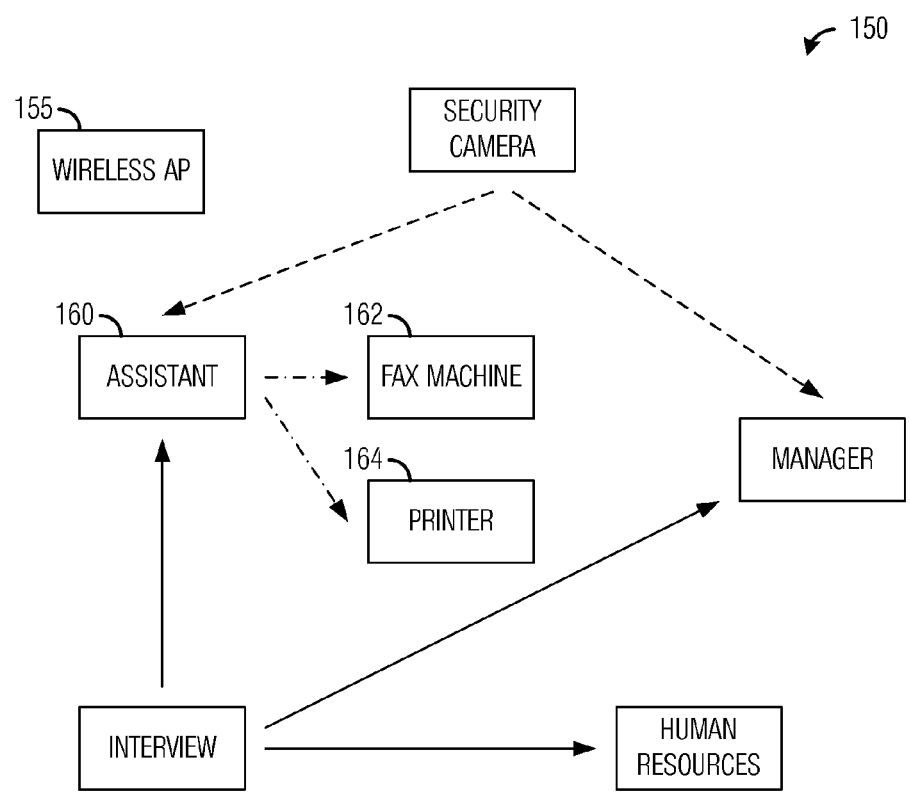
FIG. 1b illustrates an example second example communications system according to example embodiments described herein.

FIG. 1b illustrates a second example communications system 150. Communications system 150 may include a plurality of stations that are capable of communicating with one another through an AP 155. As an example, a computer used by assistant 160 may communicate with a fax machine 162 and a printer 164. It is noted that the transmission to AP 155 and from AP 155 are not shown in FIG. 1b.

In general, communicating through an AP, such as AP 105 and AP 155, adds additional messaging latency and overhead due to the extra transmission. In other words, the extra transmission between the first station and the AP and then from the AP to the second station, for example, may increase the messaging latency and overhead when compared to a direct transmission between the first station and the second station. Therefore, for some forms of communications, such as latency sensitive communications, high data throughput communications, and the like, the extra messaging latency may negatively impact the performance.

Direct Link Setup (DLS) and Tunnel DLS (TDLS) are two IEEE 802.11 protocols that allow a station (referred to as an initiator station or initiator STA) to establish a direct link between itself and another station (referred to as a responder station or responder STA). In DLS and TDLS, the initiator station establishes the direct link with the responder station by transmitting to the responder station through an AP.

Figure 2A:
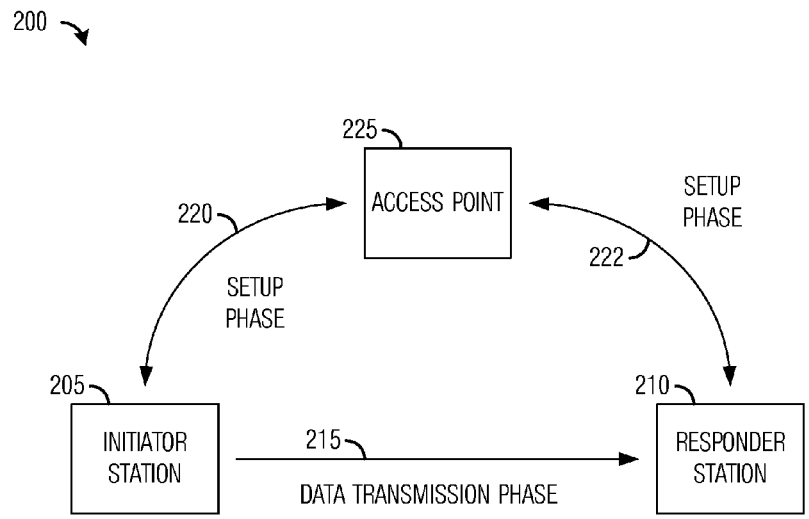
FIG. 2a illustrates an example portion of a communications system, where an establishment of a direct link using DLS and/or a TDLS is highlighted according to example embodiments described herein.

FIG. 2a illustrates a portion of a communications system 200, where an establishment of a direct link using DLS and/or a TDLS is highlighted. Communications system 200 includes an initiator station 205 and a responder station 210. Initiator station 205 is to transmit information, such as data, media, and the like, to responder station 210 through a direct link 215.

Establishing direct link 215 between initiator station 205 and responder station 210 includes a setup phase that may include an exchange of control information (using transmissions 220 and 222, for example) to configure direct link 215. In the setup phase, the control information exchanged between initiator station 205 and responder station 210 flows through an AP 225. In other words, in order to transmit the control information to responder station 210, initiator station 205 transmits the control information to AP 225, which then transmits the control information to responder station 210, and vice versa.

Figure 2B:
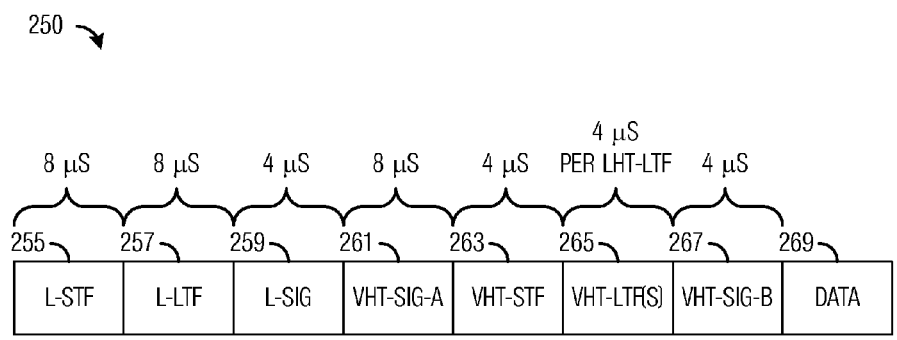
FIG. 2b illustrates an example VHT PPDU format according to example embodiments described herein.
Figure 2C:
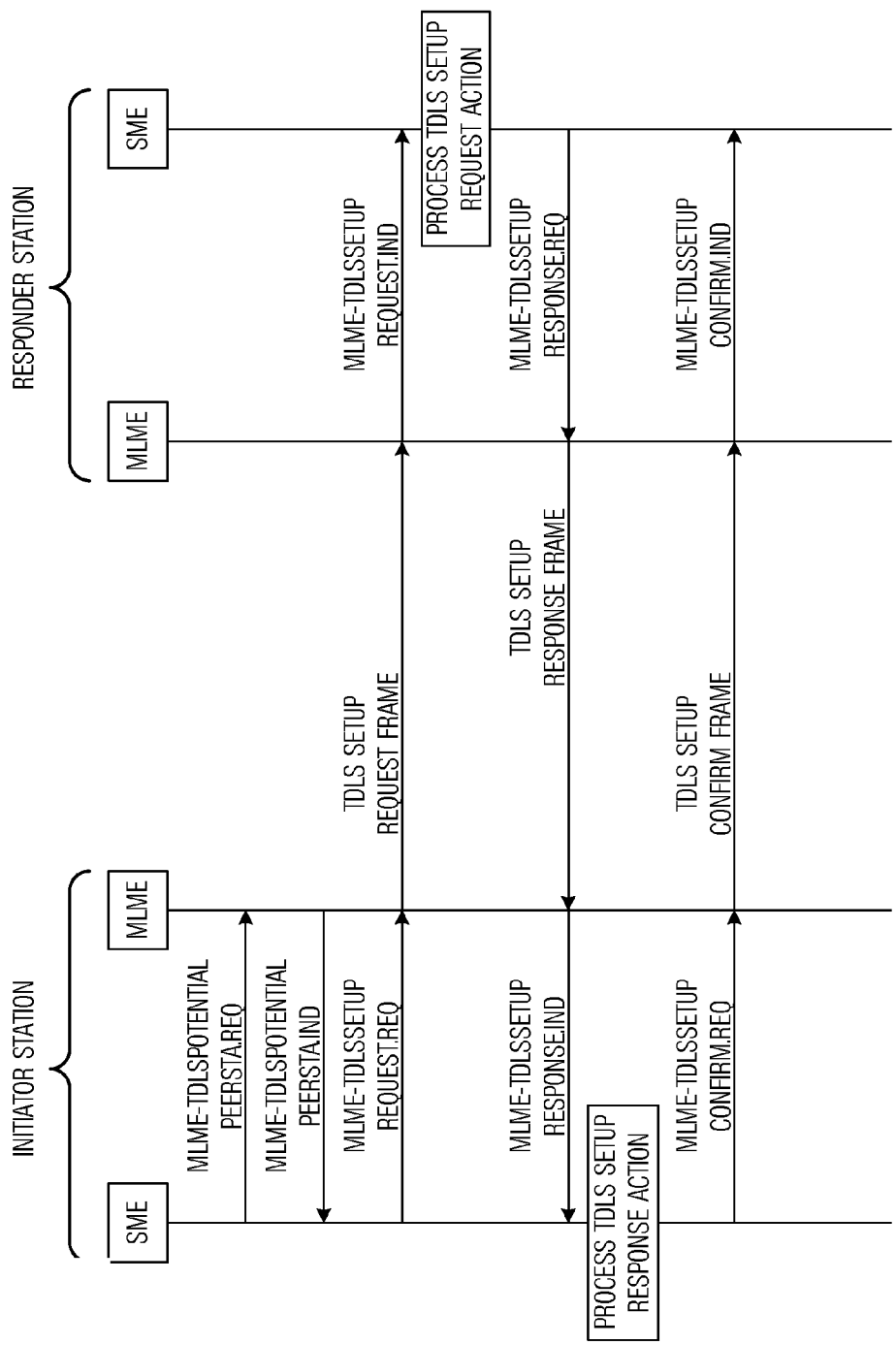
FIG. 2c illustrates an example message exchange between network entities involved in a TDLS link establishment according to example embodiments described herein.

FIG. 2b illustrates an example very high throughput (VHT) protocol data unit (PPDU) format 250. VHT PPDU includes a legacy short training field (L-STF) 255, a legacy long training field (L-LTF) 257, a legacy signal (L-SIG) field 259, a VHT signal A (VHT-SIG-A) field 261, a VHT short training field (VHT-STF) 263, one or more VHT long training fields (VHT-LTF) 265, a VHT signal B (VHT-SIG-B) field 267, and a data field 269. FIG. 2c illustrates a message exchange between entities involved in a TDLS link establishment. As shown in FIG. 2c, the message exchange involves messages exchanged between an initiator station and a responder station (which is also commonly referred to as a peer station), and entities within the two stations, including a station management entity (SME) and a Media Access Control (MAC) sublayer management entity (MLME). Referring back now to FIG. 2a, with direct link 215 is established in the setup phase, initiator 205 may use it to transmit to responder 210 in a data transmission phase.

For MU-MIMO transmission, the first symbol of VHT-SIG-A field 261 includes a group identifier and the numbers of spatial streams for each of the intended destinations (i.e., responder stations).

Multi-user multiple input, multiple output (MU-MIMO) allows a single device, such as an AP or a station, to transmit multiple independent spatial streams using multiple transmit antennas. When the source of the MU-MIMO transmission is an AP, it may be referred to as AP MU-MIMO or downlink MU-MIMO and when a non-AP station is the source of the MU-MIMO, it may be referred to as non-AP MU-MIMO. In general, in a device with N transmit antennas, up to N independent spatial streams may be transmitted with each of the N transmit antennas being used to transmit one independent spatial stream, where N is a positive integer value. The N independent spatial streams may be directed to a single device or multiple devices.

Figure 3:
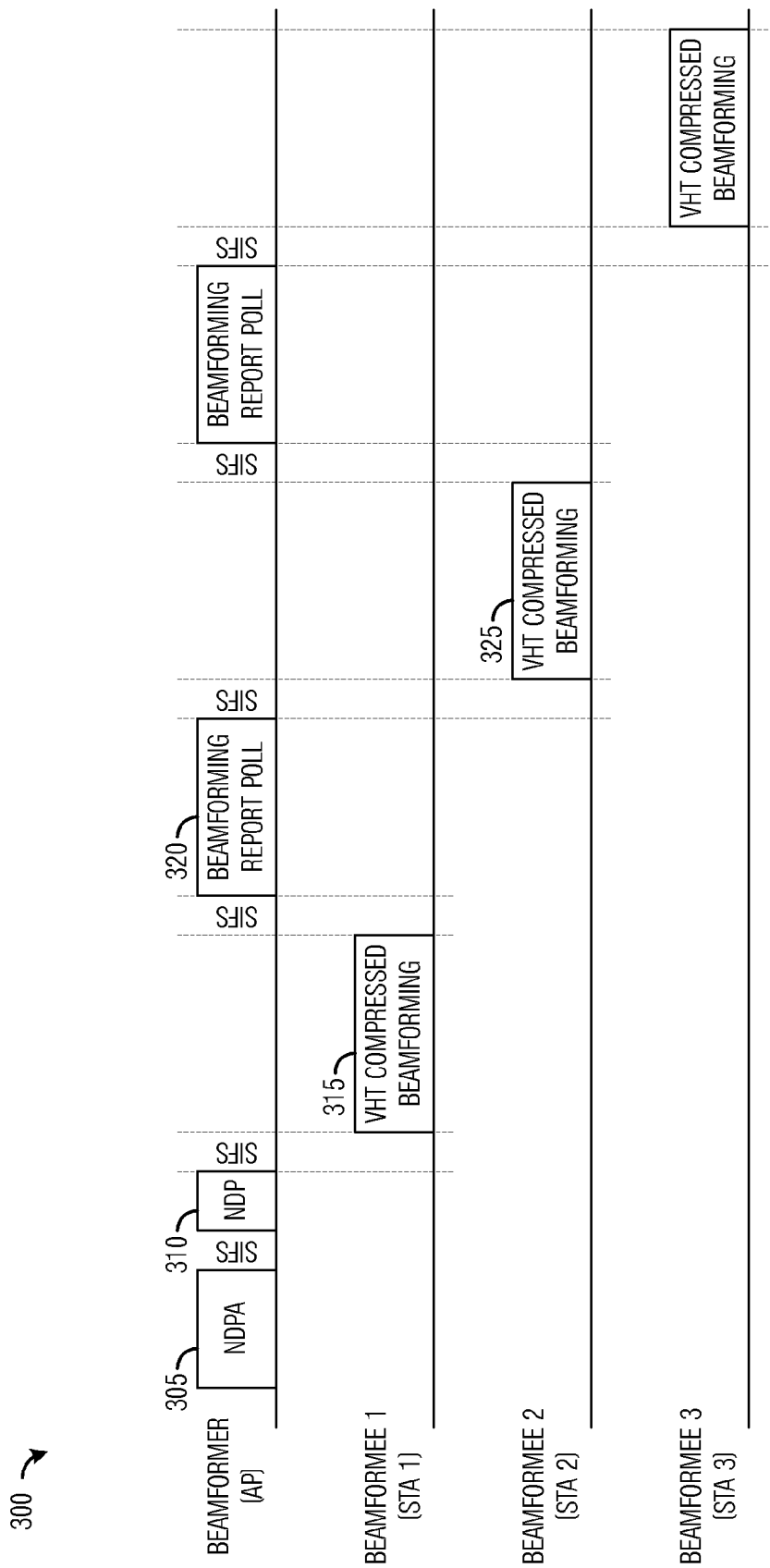
FIG. 3 illustrates an example sounding protocol used to obtain knowledge of a wireless communications channel according to example embodiments described herein.

MU-MIMO transmission requires good knowledge of the wireless communications channel. The knowledge may be obtained through measurements of beamforming (sounding) signals transmitted by an AP, which are measured by the stations. FIG. 3 illustrates a diagram 300 of an example sounding protocol used to obtain knowledge of a wireless communications channel. A beamformer, e.g., an AP, transmits a null data packet announcement (NDPA) 305 that announces that it is going to transmit a null data packet (NDP) 310. The NDPA includes the identities of those stations for which channel estimation is required. Separating NDPA 305 and NDP 310 is a short interframe space (SIFS). NDP 310 may be used by beamformees, i.e., receivers of the independent spatial streams, e.g., stations, such as STA 1, STA 2, and STA 3, to obtain knowledge of the wireless communications channel. STA 1 may feedback its knowledge of the wireless communications channel in a VHT packet 315. The beamformer may request another station report its knowledge of the wireless communications channel using a beamforming report poll 320. As shown in FIG. 3, STA 2 responds to beamforming report poll 320 and provides its knowledge of the wireless communications channel in a VHT packet 325. The beamformer may repeat transmission of the beamforming report poll to obtain additional knowledge from other beamformees.

Figure 4:
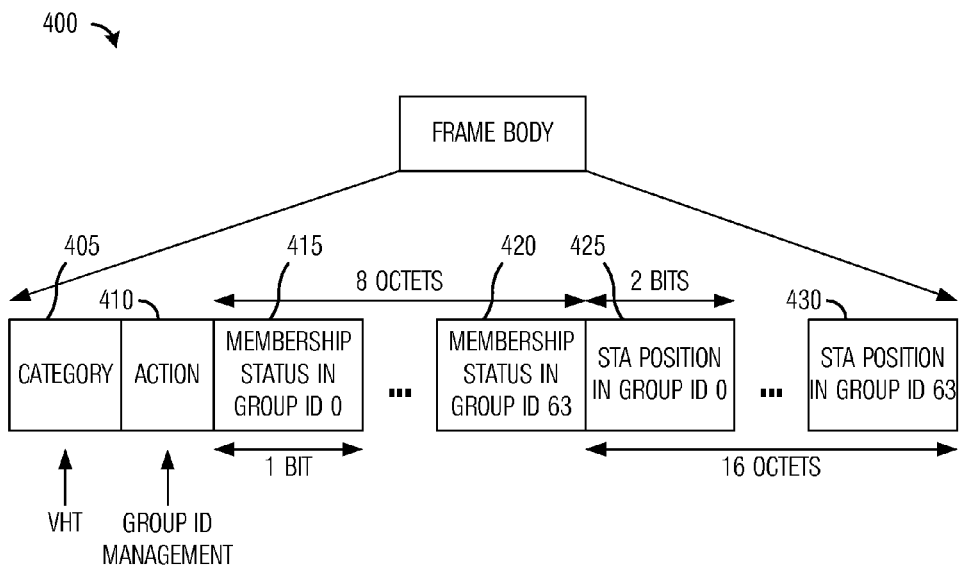
FIG. 4 illustrates an example frame with built-in support for group identifier management according to example embodiments described herein.

FIG. 4 illustrates a frame 400 with built-in support for group identifier management. As shown in FIG. 4, frame 400 may be used to manage group identifiers in a Basic Service Set (BSS). Frame 400 may be transmitted to a single station to indicate the station's membership in specific groups. In addition to indicating which groups the station belongs to, frame 400 may indicate the station's position in each of the groups.

As an example, in IEEE 802.11ac, group identifier management may be included in a group identifier management frame. Frame 400 may include a category field 405 that indicates a frame category, such as VHT. Frame 400 may also include an action field 410 that indicates a frame type, such as group identifier management.

Frame 400 also includes a plurality of group identifier membership status fields, such as membership status field 415 and membership status field 420. As an example, each membership status field may be a single bit in length; therefore, for the 64 possible group identifiers, the plurality of group identifier membership status fields may occupy a total of 8 octets (bytes).

Frame 400 also includes a plurality of station position fields, such as station position field 425 and station position field 430. As an example, each group may include up to four stations, one station per position. Hence, two bits may be sufficient to represent the possible position of a station within a group. With two bits per station position field, the plurality of station position fields may occupy a total of 16 octets or bytes.

As an illustrative example, considering a situation where a station is a member of groups having group identifiers 1, 4, and 10, with positions 0, 0, and 3 within the respective groups, then a frame transmitted to the station may have bits of membership status fields of group identifiers 1, 4, and 10 set to a binary 1 and bits of station position fields corresponding to the group identifiers set to binary 00, 00, and 11, respectively.

Frame 400 may also include a sequence number that may be incremented any time a change in group allocation occurs. As an example, when a group identifier is assigned, the sequence number may be incremented. Additionally, when a group identifier is released or expires, the sequence number may be incremented.

Figure 5:
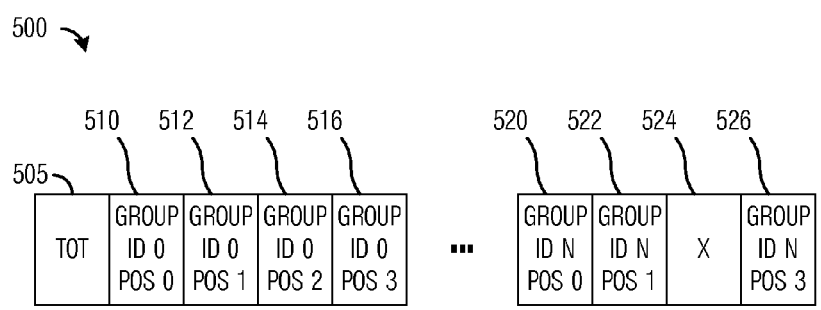
FIG. 5 illustrates an example TDLS transmission frame according to example embodiments described herein.

FIG. 5 illustrates a TDLS transmission frame 500. TDLS transmission frame 500 may be transmitted by an initiator station to a plurality of responder stations. TDLS transmission frame 500 may include a Type of Transmission (TOT) field 505 to indicate transmission type, e.g., a downlink MU-MIMO transmission from an AP to multiple stations or a TDLS MU-MIMO direct link transmission from an initiator station to multiple responder stations. For example, TOT field 505 may be a 1-bit field. It is noted that strictly speaking, TOT field 505 may not be required due to the use of ToDS and FromDS bits to distinguish TDLS frames at a media access control (MAC) layer. However, the inclusion of TOT field 505 provides advantages such as faster recognition of the transmission type at a physical (PHY) layer, and stations not engaged in TDLS communications may be able to enter power savings mode when detecting messages with TOT fields set to indicate TDLS MU-MIMO direct link transmissions. Additionally, TOT field 505 may be extended to indicate other transmission types with the addition of extra bits, such as mesh transmission, and the like. The management of group identifier for TDLS direct link transmissions and normal transmissions may be achieved with different management processes, determined by the value of TOT field 505.

According to an alternative example embodiment, one or more bits in VHT-SIG-A field, such as VHT-SIG-A field 261, of a VHT PPDU may be used to distinguish between AP and station originator of a TDLS transmission. As an example, if the one or more bits in the VHT-SIG-A field is set to a first value, then the AP may be the originator of the TDLS transmission, while if the one or more bits in the VHT-SIG-A field is set to a second value, then the station may be the originator of the TDLS transmission. As an example, bits 13-21 of a VHT PPDU may contain one or more bits to distinguish between AP and/or station originator of a TDLS transmission.

According to another alternative example embodiment, an originator address and a group identifier may be used to determine the source of a station originator of a TDLS transmission. As an example, target destinations of the TDLS transmission associate the group identifier with a base station identifier and the originator address to distinguish between multiple TDLS transmissions. The association between the group identifier and the base station identifier and the originator address may be retained for as long as the TDLS link remains active.

TDLS transmission frame 500 may also include information intended for the various responder stations participating in TDLS direct link operation. As shown in FIG. 5, the information intended for the various responder stations may be organized by group identifier and position. As an example, consider a situation wherein there are four responder stations for a group corresponding to group identifier zero (0). Then, the information for each of the four responder stations may be transmitted in network resources, such as spatial streams, corresponding positions 0, 1, 2, and 3 (shown as blocks 510, 512, 514, and 516). As another example, consider a situation wherein there are three responder stations for a group corresponding to group identifier N with the responder stations located in positions 0, 1, and 3. Then, the information for each of the three responders may be transmitted in network resources, such as spatial streams, corresponding positions 0, 1, and 3 (shown as blocks 520, 522, and 526).

Figure 6A:
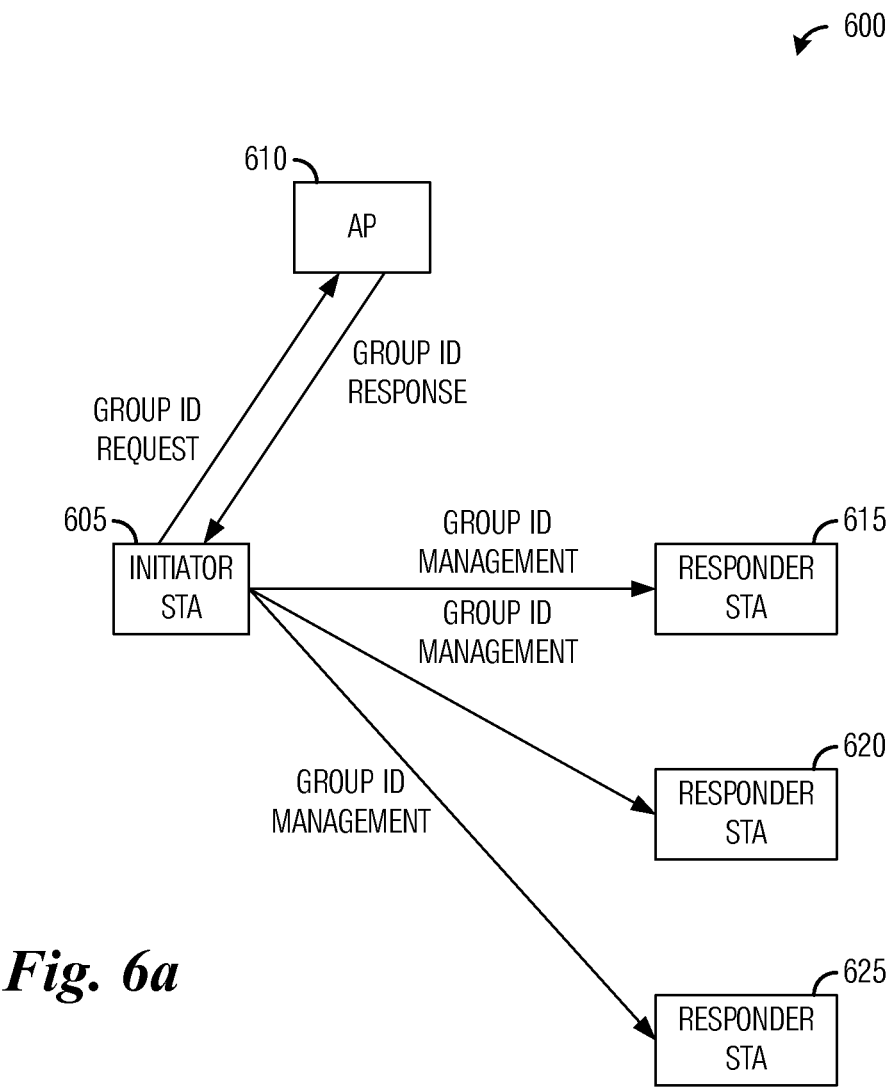
FIG. 6a illustrates an example communications system where an initiator station is requesting group identification information from an AP to configure direct link communications according to example embodiments described herein.

FIG. 6a illustrates a communications system 600 where an initiator station is requesting group identification information from an AP to configure direct link communications. It is noted that although the discussion focuses on an AP performing group identification and/or position management, any communications controller in communications system, such as a centralized controller, a switch to which the AP is connected, and the like, may perform group identification and/or position management. Therefore, the discussion of the AP performing group identification and/or position management should not be construed as being limiting to either the scope or the spirit of the example embodiments.

Communications 600 includes an initiator station 605 and an AP 610 that is serving initiator station 605. As shown in FIG. 6a, initiator station 605 is to directly transmit to a plurality of responder stations, including responder station 615, responder station 620, and responder station 625. However, in order to directly transmit to the plurality of responder stations, initiator station 605 may need to configure direct link communications with the plurality of responder stations.

In order to configure direct link communications, initiator station 605 may need to obtain group identification information for the responder stations in the plurality of responder stations from AP 610. According to an example embodiment, initiator station 605 may transmit a group identifier request message to AP 610 to request the group identification information for the plurality of responder stations. As an example, initiator station 605 may send a separate group identifier request message to the AP for each responder station in the plurality of responder stations. Each group identifier request message may include information about the responder station. Alternatively, each group identifier request message may include a proposed group identifier for the responder station. As an example, the proposed group identifier may be a sequence number of a last group management frame received by initiator station 605.

As an alternative example embodiment, initiator station 605 may send to the AP a single group identifier request message for all of the responder stations in the plurality of responder stations. The group identifier request message may include information about each of the responder stations in the plurality of responder stations. Alternatively, the group identifier request message may include proposed group identifiers for each of the responder stations.

It may be possible to utilize a partial base station set identifier such as the Basic Service Set ID (BSSID) from non-AP MU-MIMO transmissions to alleviate collisions between group identifiers from neighboring base station sets (OBSS). As an example, a space of available group identifiers may be partitioned into two sets: a first set dedicated for AP MU-MIMO and a second set dedicated for non-AP MU-MIMO. The size of each set may be periodically advertised in a beacon or may be fixed by design, technical specification, and the like. The partitioning of the space of available group identifiers allows the re-use of a number of bits, e.g., bits B4-B9 of the PPDU, for the partial BSSID.

As an illustrative example, if there are 8 group identifiers dedicated to non-AP MU-MIMO, only three bits are needed for such group identifiers, e.g., only three bits out of bits B4-B9 will be used, leaving three bits available for use elsewhere. Furthermore, since a station typically has fewer antennas than an AP, it is suggested that the number of spatial streams be reduced to less than 4 for non-AP MU-MIMO, i.e., 2 bits per station with a maximum of 4 stations. Therefore, only 8 bits out of bits B10-B21 will be used, so there are 4 remaining bits for a partial BSSID. In total, up to 7 bits may be used for the partial BSSID.

Continuing with the illustrative example, a responder station may decode the group identifier and based on an allocation history, it may be able to recognize that the group identifier corresponds to an AP MU-MIMO transmission or a non-AP MU-MIMO transmission. If the group identifier corresponds to a non-AP MU-MIMO transmission, the responder station may interpret bits B18-B21 as a partial BSSID. A partial BSSID may be a bitwise combination of a BSS or just a subset of the BSS identifier bits, e.g., the last 4 bits of the BSS identifier.

It may also be possible to combine some or all of the above discussed solutions. As an example, the space of available group identifiers may still be separated and reduced bitwise, with some of the spared bits from the group identifier being used to implement a partial AID that is a combination of BSSID bits or other information. For example, in an example embodiment, there may be 16 group identifiers allocated by the AP for non-AP MU-MIMO with the number of spatial streams reduced to 4 requiring 2 bits. Hence, there will be a total of 6 bits spared that may be used as a partial AID. The 6 bit partial AID may contain a combination of BSSID bits, with one of the bits being used as the ToT bit.

AP 610 may reserve a subset of available group identifiers for use in non-AP MU-MIMO transmissions. As an example, AP 610 may partition the available group identifiers into two subsets: a first subset for AP MU-MIMO transmissions and a second subset for non-AP MU-MIMO transmissions, and then assign group identifiers according to an intended use (e.g., AP MU-MIMO or non-AP MU-MIMO). AP 610 may manage the assignment of the group identifiers and therefore may ensure that the group identifiers are uniquely allocated.

The use of different subsets of available group identifiers to assign group identifiers may allow for responder stations to differentiate between MU-MIMO transmissions from AP 610 and non-AP stations simply based on the group identifier in the MU-MIMO transmission. As an example, a responder station may be able to recognize a non-AP MU-MIMO transmission when it recognizes that the group identifier belongs to a subset associated with non-AP MU-MIMO transmissions or that the group identifier was previously allocated to it by a non-AP station.

AP 610 may send a group identifier response message to initiator station 605. The group identifier response message may include a group identifier for the responder station if the group identifier request message contained a request for a group identifier of a single responder station (in which case, there is a group identifier response message for each group identifier request message) or a plurality of group identifiers with each group identifier corresponding to a single responder station in the plurality of responder stations. Alternatively, the group identifier response message may include a range of group identifiers. It is noted that if initiator station 605 does not receive the group identifier response message from AP 610 in a timely manner, it may elect to repeat the request, delay the request, or abandon the request.

As an example, if initiator station 605 includes a proposed group identifier for a responder station in the group identifier request message, AP 610 may respond with an acknowledgement if the proposed group identifier is available for assignment to the responder station. If the proposed group identifier is not available for assignment to the responder station, AP 610 may respond with a group identifier response message with a group identifier that is available for assignment to the responder station.

AP 610 may always respond to the group identifier request message with a group identifier response message including a group management frame, which may eliminate a requirement that the group management frames include the sequence number.

It is noted that AP 610 may also manage responder station positions as well as responder station group identifiers. If AP 610 also manages positions, the group identifier response message may also include positions. If AP 610 does not manage positions, initiator station 605 may manage the responder station positions by itself or another entity in the communications system may manage the positions.

It is noted that the group identifier(s) allocated by AP 610 may have an associated lifetime (e.g., a time to live). As an example, the lifetime may be expressed in a number of beacon periods. Initiator station 605 may decrement the lifetime per beacon period. The group identifier(s) may be valid for the duration of the associated lifetime and will expire at the end of the duration unless initiator station 605 requests an extension of the lifetime (e.g., by sending a group identifier extension request message to AP 610 to which AP 610 may respond with a group identifier extension response message that either approves and providing a new lifetime or rejects the extension request) or releases it prior to the end of the duration.

Initiator station 605 may then configure the direct link transmissions with the plurality of responder stations by informing the plurality of responder stations their group identifier and position. As an example, initiator station 605 may inform the plurality of responder stations their respective group identifier and position by transmitting a direct link group identifier management frame, which identifies each responder station and provides the group identifier and the position assigned to the responder station. Initiator station 605 may inform each responder station individually in a unicast transmission. As another example, initiator station 605 may use a TDLS setup request frame, where a group identifier inclusion in the TDLS setup frame may serve as an indication to a responder station that this is to be used for non-AP MU-MIMO over DLS transmissions. The responder station may reply with a TDLS setup response frame.

Group signaling may be important for battery conservation purposes. In a single user transmission, a station may decode a VHT-SIG-A field and determines if it is an intended receiver of a SU-MIMO transmission. For SU-MIMO, bits B4-B9 carry the group identifier, bits B10-B12 carry a number of spatial streams, and bits B13-B21 carry a partial address identifier (AID). When a station decodes the partial AID of a SU-MIMO transmission, it if is not an intended receiver, it stops its decoding of the remainder of the transmission, thereby conserving battery power.

Initiator station 605 may release the group identifier provided by AP 610 after it no longer has a need for the group identifier, e.g., once the non-AP MU-MIMO transmissions are complete. As an example, initiator station 605 may transmit a group identifier release message.

It is noted that although the discussion focuses on AP 610 performing group identifier and/or position management, another entity in the communications system may perform group identifier and/or position management. As an example, any communications controller in the communications system, stand-alone or integrated with another entity, such as a centralized controller, a switch to which the AP is connected, and the like, may manage group identifier and/or position information.

It is also noted that the group identifier request, the group identifier response, the group identifier management, channel sounding, and the direct link transmission setup may occur sequentially. It is however noted that two or more of the events may occur simultaneously or substantially simultaneously via a piggybacking of necessary information. As an example, the group identifier response may occur during group identifier management, or direct link transmission setup may occur with a subsequent group identifier request. It is further noted that the ordering of the events may be altered. As an example, initiator station 605 may perform direct link transmission setup with multiple responder stations, and then perform channel sounding and group identifier request from AP 610, followed by sending the group identifier(s) and positions to the multiple responder stations prior to starting its non-AP MU-MIMO transmissions. As another example, initiator station 605 may inform the multiple responder stations about the group identifier(s) and the positions at the same time as the direct link transmission setup by piggybacking on the direct link setup frames (e.g., either DLS or TDLS). As yet another example, AP 610 informs the responder stations about the group identifier(s) and the positions. In such a situation, the positions are also managed by AP 610 and AP 610 may need to inform the responder stations that the group identifier corresponds to a non-AP MU-MIMO transmission if there is no separation of group identifiers, i.e., no different subsets of available group identifiers used for different types of MU-MIMO transmission.

It is noted that that group identifier and/or position management by an AP (or some other centralized entity) allows for the assurance that there is no group identifier duplication, it may be possible to allow for the duplication of group identifiers in certain situations as long as there is no responder station group membership conflict. As an example, group identifiers may be duplicated at two or more initiator stations as long as the two or more initiator stations do not belong to groups having the same group identifier but with different responder stations. As an example, an initiator station, when it asks for a group identifier from an AP, may need to communicate to the AP a list of potential responder stations that will be associated with the group identifier. The initiator station may provide a list of AIDs or MAC addresses of the responder stations, for example. The AP may compare the list with its database of group identifiers and responder stations, and assign a group identifier to the initiator station so that there are no responder stations that belong to the same group identifier but requested by a different initiator station.

It is further noted that an AP may simply allocate group identifiers per request without verification of duplication and/or responder station group membership conflict. As an example, the responder station may associate with a group identifier unique information, e.g., an address, about the initiator station. Therefore, two groups having the same group identifier are actually different because they have different initiator stations. A number of bits from the STS field may be used as a partial AID and help identify a source identity or the BSSID for a MU-MIMO transmission. When a responder station receives a MU-MIMO transmission with a known group identifier, it may proceed further and decode the data payload and identify the address of the source. If the partial AID exists, it helps a station that belongs to a group with the same group identifier to decide if the MU-MIMO transmission originated at a known initiator station or at an unknown initiator station that has the same group identifier. The responder station may simply drop the MU-MIMO transmission if the MU-MIMO transmission originated at an unknown initiator station.

The discussion of FIG. 6a focuses on initiator station initiated group management. It may be possible for an AP to initiate group management. If the AP initiates group management, the AP may send group identifiers to each responder station in the group. The AP may send the group identifiers to each responder station in individual unicast messages. The AP may alternatively send the group identifiers to all of the responder stations in a single broadcast message.

According to an alternative example embodiment, the group management frame may be broadcast in the BSS when there is a change in group status. In between the group management broadcasts, the AP may periodically broadcast the sequence number of the last broadcast group management frame in the beacons, for example. The sequence number may be useful since broadcasts may not be reliably decoded by all stations and the stations use the sequence number to determine if a broadcast has been missed. If a station determines that it has missed a broadcast, the station may request group information using the group information request message as described previously. The group information may then be provided to the station in an information element piggy backed with another transmission, such as an association frame.

Figure 6B:
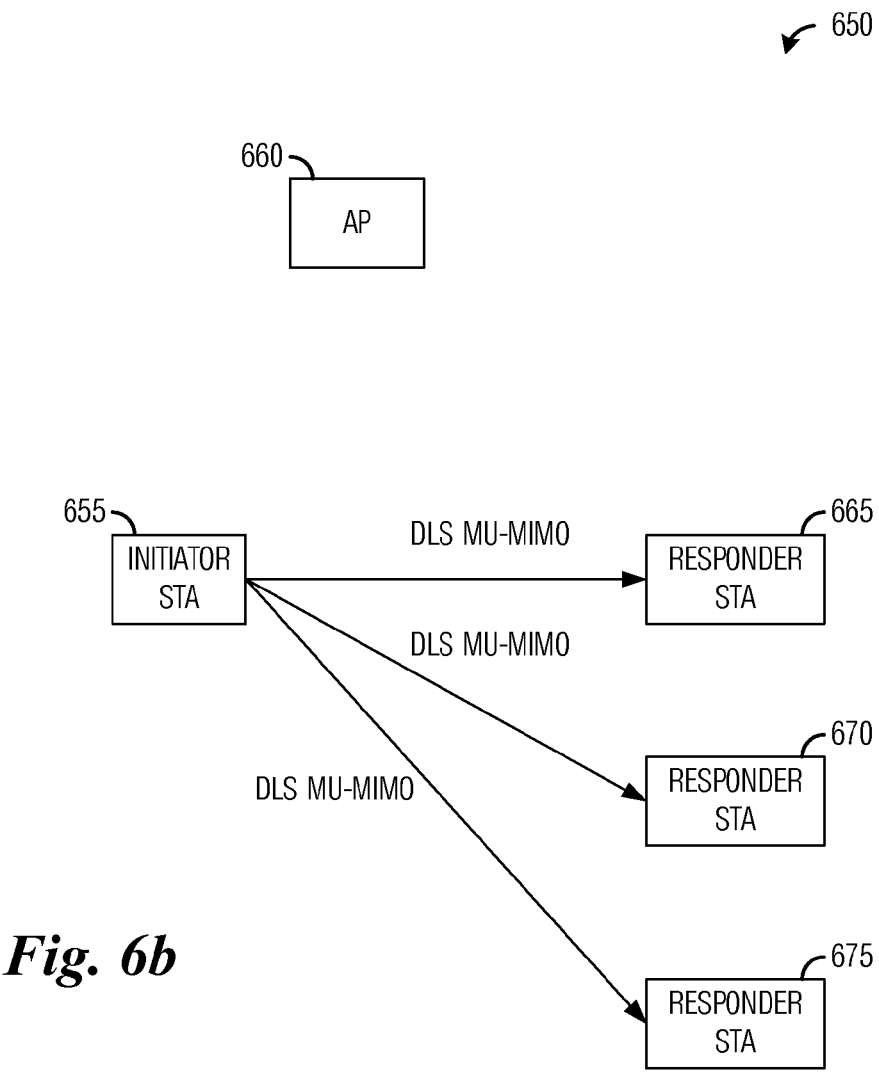
FIG. 6b illustrates an example communications system where an initiator station is directly transmitting to a plurality of responder stations in a single transmission according to example embodiments described herein.

FIG. 6b illustrates a communications system 650 where an initiator station is directly transmitting to a plurality of responder stations in a single transmission. Once the direct link communications has been set up, an initiator station 655 may transmit directly to a plurality of responder stations, such as responder station 665, responder station 670, and responder station 675 without having to transmit to AP 660 first.

Figure 7A:
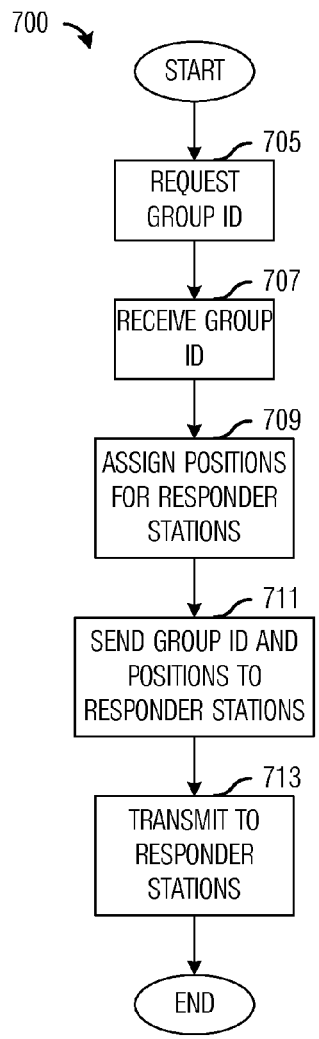
FIG. 7a illustrates an example flow diagram of operations in an initiator station transmitting directly to a plurality of responder stations where an AP manages group identifiers for the plurality of responder stations according to example embodiments described herein.

FIG. 7a illustrates a flow diagram of operations 700 in an initiator station transmitting directly to a plurality of responder stations where an AP manages group identifiers for the plurality of responder stations. Operations 700 may be indicative of operations occurring in an initiator station, such as initiator station 605 and initiator station 655, as the initiator station configures a direct link transmission with responder stations and then transmits to the responder stations using the direct link transmission.

Operations 700 may begin with the initiator station requesting a group identifier(s) from an AP (or some other entity in a communications system that includes the initiator station responsible for managing group identifiers) for use in configuring a direct link transmission from the initiator station (block 705). The initiator station may request the group identifier(s) from the AP by transmitting a group identifier request message to the AP. The initiator station may receive the group identifier(s) from the AP (block 707). The group identifier(s) may be received from the AP in a group identifier response message.

Since configuration of the direct link transmission also utilizes position, the initiator station may assign or select positions for each of the responder station (block 709). The initiator station may assign responder station so that each responder station is assigned a unique group identifier and position combination. The initiator station may assign group identifier and position combinations to responder stations so that there is no conflict in the assigned group identifier and position combinations. As an example, there is a conflict when two (or more) responder stations assigned the same group identifier and position combination. However, there is no conflict when two (or more) responder stations are assigned the same group identifier but different positions.

The initiator station may send the group identifier and the position to each of the responder stations (block 711). The transmission may be sent through the AP. The initiator station may send the group identifier and the position to each responder station individually in unicast transmissions or the initiator station may send the group identifier(s) and the positions to all of the responder stations in a single broadcast transmission. As an example, the initiator station may send a direct link setup request message. The initiator station may receive a response from the responder stations, e.g., direct link setup response messages. The initiator station may transmit to the responder stations using the direct link transmission (block 713). The direct link transmission includes data for the responder stations. The data for each responder station may be labeled with the responder station's group identifier and located according to the position of the responder station.

Figure 7B:
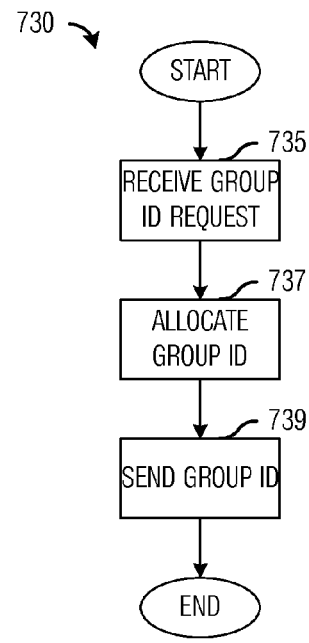
FIG. 7b illustrates an example flow diagram of operations in an AP managing group identifiers for responder stations according to example embodiments described herein.

FIG. 7b illustrates a flow diagram of operations 730 in an AP managing group identifiers for responder stations. Operations 730 may be indicative of operations occurring in an AP, such as AP 610 and AP 660, as the AP performs group identifier management for responder stations in direct link transmissions.

Operations 730 may begin with the AP receiving a request for a group identifier(s) from an initiator station (block 735). The request for the group identifier(s) may be received in a group identifier request message. The AP may allocate or select the group identifier(s) (block 737) and send the group identifier(s) to the initiator station (block 739). The group identifier(s) may be sent to the initiator station in a group identifier response message.

Figure 7C:
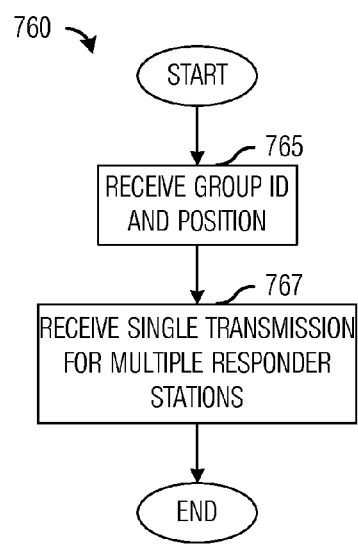
FIG. 7c illustrates an example flow diagram of operations in a responder station receiving a direct link transmission from an initiator station according to example embodiments described herein.

FIG. 7c illustrates a flow diagram of operations 760 in a responder station receiving a direct link transmission from an initiator station. Operations 760 may be indicative of operations occurring in a responder station, such as responder station 615, responder station 620, responder station 665, and responder station 670, as the responder station receives a direct link transmission from an initiator station.

Operations 760 may begin with the responder station receiving a group identifier and a position from the initiator station (block 765). The group identifier and the responder station may be received in a group management frame. The responder station may send back a response to the initiator station. The responder station may then receive a single transmission intended for multiple responder stations (block 767). Data intended for the responder station may be labeled with the group identifier of the responder station and located at the position.

Figure 8A:
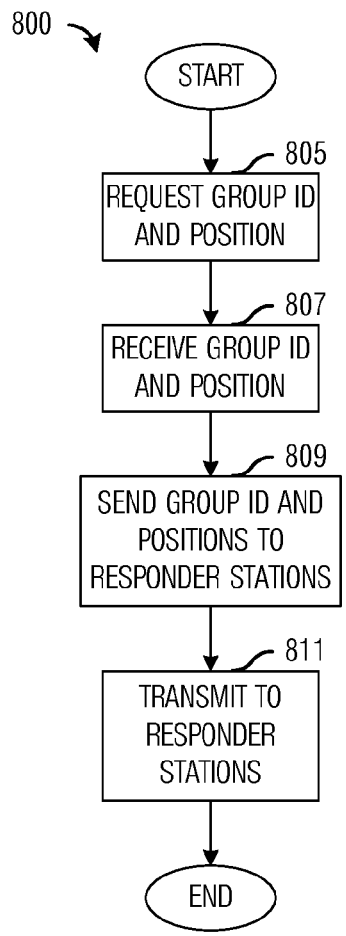
FIG. 8a illustrates an example flow diagram of operations in an initiator station transmitting directly to a plurality of responder stations where an AP manages group identifiers and positions for the plurality of responder stations according to example embodiments described herein.

FIG. 8a illustrates a flow diagram of operations 800 in an initiator station transmitting directly to a plurality of responder stations where an AP manages group identifiers and positions for the plurality of responder stations. Operations 800 may be indicative of operations occurring in an initiator station, such as initiator station 605 and initiator station 655, as the initiator station configures a direct link transmission with responder stations and then transmits to the responder stations using the direct link transmission.

Operations 800 may begin with the initiator station requesting a group identifier(s) and positions from an AP (or some other entity in a communications system that includes the initiator station responsible for managing group identifiers) for use in configuring a direct link transmission from the initiator station (block 805). The initiator station may request the group identifier(s) and the positions from the AP by transmitting a group identifier request message to the AP. The initiator station may receive the group identifier(s) and the positions from the AP (block 807). The group identifier(s) and the positions may be received from the AP in a group identifier response message.

The initiator station may send the group identifier and the position to each of the responder stations (block 809). The initiator station may send the group identifier and the position to each responder station individually in unicast transmissions or the initiator station may send the group identifier(s) and the positions to all of the responder stations in a single broadcast transmission. The initiator station may transmit to the responder stations using the direct link transmission (block 811).

Figure 8B:
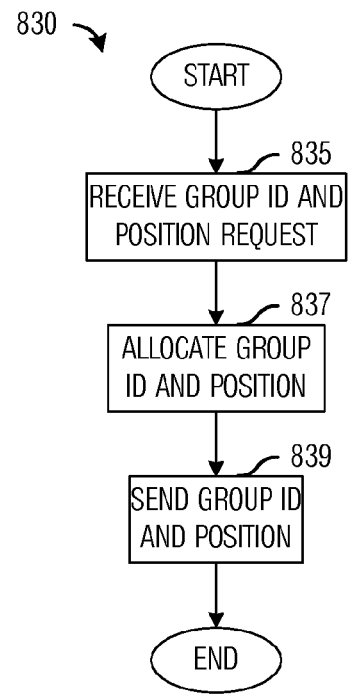
FIG. 8b illustrates an example flow diagram of operations in an AP managing group identifiers and positions for responder stations according to example embodiments described herein.

FIG. 8b illustrates a flow diagram of operations 830 in an AP managing group identifiers and positions for responder stations. Operations 830 may be indicative of operations occurring in an AP, such as AP 610 and AP 660, as the AP performs group identifier management for responder stations in direct link transmissions.

Operations 830 may begin with the AP receiving a request for a group identifier(s) and positions from an initiator station (block 835). The request for the group identifier(s) and the positions may be received in a group identifier request message. The AP may allocate or select the group identifier(s) and the positions (block 837) and send the group identifier(s) and the positions to the initiator station (block 839). The group identifier(s) and the positions may be sent to the initiator station in a group identifier response message.

Figure 8C:
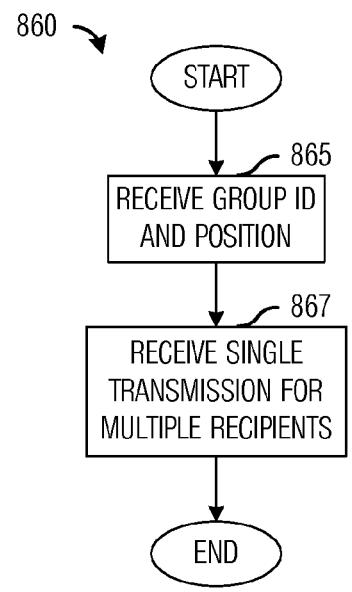
FIG. 8c illustrates an example flow diagram of operations in a responder station receiving a direct transmission from an initiator station according to example embodiments described herein.

FIG. 8c illustrates a flow diagram of operations 860 in a responder station receiving a direct transmission from an initiator station. Operations 860 may be indicative of operations occurring in a responder station, such as responder station 615, responder station 620, responder station 665, and responder station 670, as the responder station receives a direct link transmission from an initiator station.

Operations 860 may begin with the responder station receiving a group identifier and a position from the initiator station (block 665). The group identifier and the responder station may be received in a group management frame. The responder station may send back a response to the initiator station. The responder station may then receive a single transmission intended for multiple responder stations (block 867). Data intended for the responder station may be labeled with the group identifier of the responder station and located at the position.

Figure 9:
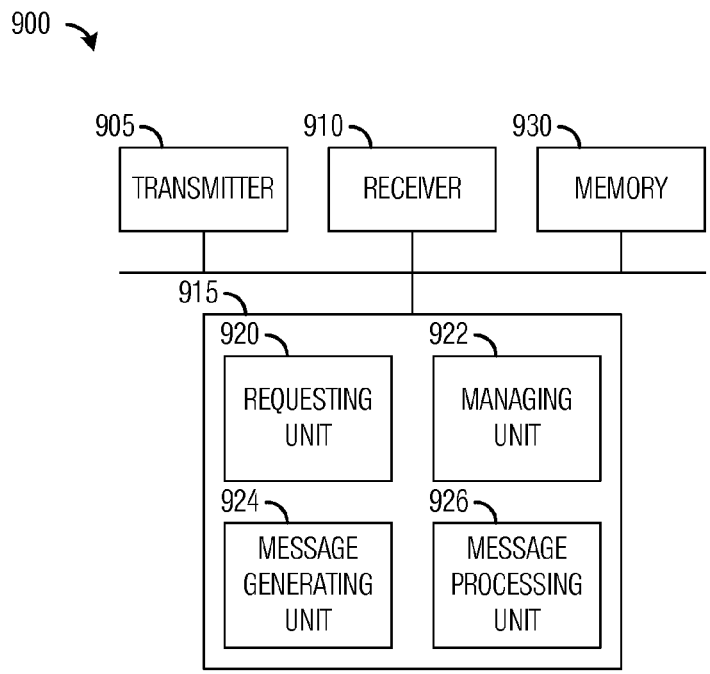
FIG. 9 illustrates an example first communications device according to example embodiments described herein.

FIG. 9 illustrates a diagram of a first communications device 900. First communications device 900 may be an implementation of a station, such as an initiator station, of a communications system. First communications device 900 may be used to implement various ones of the embodiments discussed herein. As shown in FIG. 9, a transmitter 905 is configured to send group identifier request messages, group identifier extension request messages, TDLS Setup Request messages, information to an AP, information to a responder station over a TDLS direct link, and the like, and a receiver 910 is configured to receive group identifier response messages, group identifier extension response messages, TDLS Setup Response messages, information, and the like. Transmitter 905 and receiver 910 may have a wireless interface, a wireline interface, or a combination thereof.

A requesting unit 920 is configured to request group identifier and/or position from an AP or another entity in the communications system that is managing group information. A managing unit 922 is configured to manage positions in a situation where the AP or the other entity does not manage position or if first communications device 900 overrides the management of the AP or the other entity. A message generating unit 924 is configured to generate messages, such as group identifier request messages, group identifier extension request messages, TDLS Setup Request messages, and the like. A message processing unit 926 is configured to process received messages, such as group identifier response messages, group identifier extension response message, TDLS Setup Response messages, and the like. A memory 930 is configured to store group identifiers, positions, responder stations, TDLS direct link configurations, and the like.

The elements of first communications device 900 may be implemented as specific hardware logic blocks. In an alternative, the elements of first communications device 900 may be implemented as software executing in a processor, controller, application specific integrated circuit, or so on. In yet another alternative, the elements of first communications device 900 may be implemented as a combination of software and/or hardware.

As an example, transmitter 905 and receiver 910 may be implemented as a specific hardware block, while requesting unit 920, managing unit 922, message generating unit 924, and message processing unit 926 may be software modules executing in a processor 915, such as a microprocessor, a digital signal processor, a custom circuit, or a custom compiled logic array of a field programmable logic array. Requesting unit 920, managing unit 922, message generating unit 924, and message processing unit 926 may be stored as modules in memory 930.

Figure 10:
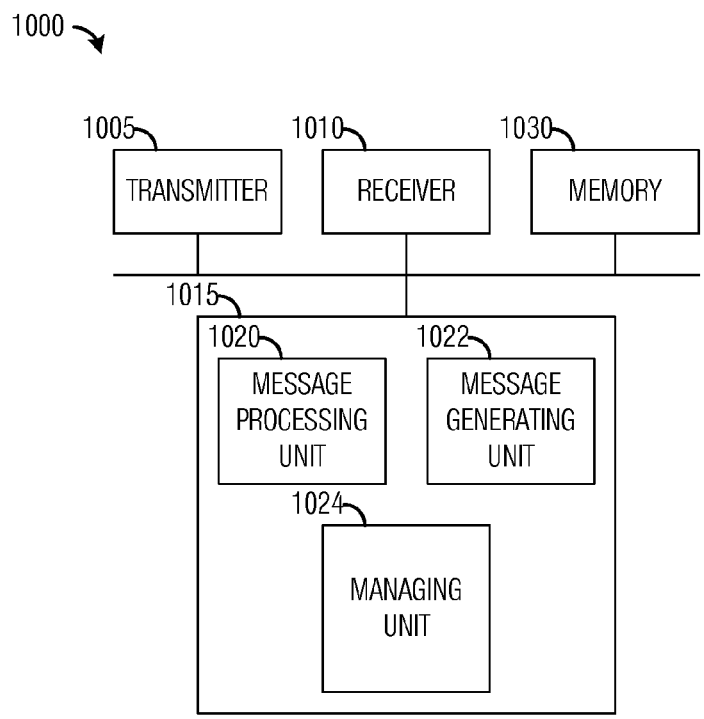
FIG. 10 illustrates an example second communications device according to example embodiments described herein.

FIG. 10 illustrates a diagram of a second communications device 1000. Second communications device 1000 may be an implementation of a communications controller, such as an AP, of a communications system. Second communications device 1000 may be used to implement various ones of the embodiments discussed herein. As shown in FIG. 10, a transmitter 1005 is configured to send group identifier response messages, group identifier extension request messages, information to an initiator station, information to a responder station, and the like, and a receiver 1010 is configured to receive group identifier request messages, group identifier extension request messages, information from an initiator station, and the like. Transmitter 1005 and receiver 1010 may have a wireless interface, a wireline interface, or a combination thereof.

A message processing unit 1020 is configured to process messages, such as a group identifier request messages, group identifier extension request messages, and the like. A message generating unit 1022 is configured to generate messages, such as group identifier response messages, group identifier extension response message, and the like. A managing unit 1024 is configured to manage assignments of group identifiers and/or positions to responder stations. A memory 1030 is configured to store group identifiers, positions, initiator stations, and the like.

The elements of second communications device 1000 may be implemented as specific hardware logic blocks. In an alternative, the elements of second communications device 1000 may be implemented as software executing in a processor, controller, application specific integrated circuit, or so on. In yet another alternative, the elements of second communications device 1000 may be implemented as a combination of software and/or hardware.

As an example, transmitter 1005 and receiver 1010 may be implemented as a specific hardware block, while message processing unit 1020, message generating unit 1022, and managing unit 1026 may be software modules executing in a processor 1015, such as a microprocessor, a digital signal processor, a custom circuit, or a custom compiled logic array of a field programmable logic array. Message processing unit 1020, message generating unit 1022, and managing unit 1026 may be stored as modules in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for transmitting to a plurality of responder stations, the method comprising:
   selecting, by a non-access point (non-AP) initiator station, first and second responder stations for multiple-user multiple-input multiple output (MU-MIMO) transmission;
   requesting, by the non-AP initiator station from a communications controller, a first group identifier for the first responder station and a second group identifier for the second responder station;
   receiving, by the non-AP initiator station from the communications controller, the first group identifier for the first responder station, and the second group identifier for the second responder station;
   requesting a first position for the first responder station from the communications controller;
   receiving the first position from the communications controller;
   requesting a second position for the second responder station from the communications controller; and
   receiving the second position from the communications controller, wherein the second position is different from the first position;
   transmitting, by the non-AP initiator station, a first direct link setup request message to the first responder station via an access point, the first direct link setup request message including the first group identifier and the first position;
   transmitting, by the non-AP initiator station, a second direct link setup request message to the second responder station via the access point, the second setup request message including the second group identifier and the second position; and
   transmitting, by the non-AP initiator station, data to the first responder station and the second responder station in a single MU-MIMO transmission, a first portion of the data intended for the first responder station labeled with the first group identifier and located in the first position, and a second portion of the data intended for the second responder station labeled with the second group identifier and located in the second position.

2. The method of claim 1, further comprising:
   selecting the first position for the first responder station; and
   selecting the second position for the second responder station.

3. The method of claim 2, wherein the first group identifier and the first position do not conflict with the second group identifier and the second position.

4. The method of claim 2, wherein the first group identifier and the first position are not already reserved for use with another responder station.

5. The method of claim 1, wherein requesting the first group identifier the first position comprises transmitting a first group identifier request message for both the first group identifier and the first position.

6. The method of claim 1, further comprising:
   receiving a first direct link setup response message from the first responder station; and
   receiving a second direct link setup response message from the second responder station.

7. The method of claim 1, wherein requesting the first group identifier comprises transmitting a group identifier request message with a first sequence number.

8. The method of claim 7, wherein receiving the first group identifier comprises receiving an acknowledgement if the first sequence number is a valid value.

9. The method of claim 7, wherein receiving the first group identifier comprises receiving an alternate value to use as the first group identifier when the first sequence number is not a valid value.

10. The method of claim 1, wherein the first group identifier includes a first time to live, and wherein the method further comprises transmitting a group identifier extension request message to the access point to extend the first time to live of the first group identifier.

11. The method of claim 1, wherein the communications controller is the access point.

12. The method of claim 1, wherein the communications controller is a switch.

13. A method for operating an access point, the method comprising:
   receiving, by the access point from a non-access point (non-AP) initiator station, a first group identifier request and a first position request for a first responder station selected by the non-AP initiator station for multiple-user multiple-input multiple output (MU-MIMO) transmission; and requesting a first position for the first responder station from a communications controller;
   selecting, by the access point, a first group identifier and the first position in a first group for the first responder station;
   transmitting, by the access point, the first group identifier and the first position to the non-AP initiator station, wherein the first position identifies a first data location for the first responder station in a single MU-MIMO transmission from the non-AP initiator station; and
   receiving the first position from the communications controller;

receiving, by the access point from the non-AP initiator station, a second group identifier request and a second position request for a second responder station selected by the non-AP initiator station for MU-MIMO transmission; and requesting a second position for the second responder station from the communications controller;

selecting, by the access point, a second group identifier and the second position in a second group for the second responder station;

transmitting, by the access point, the second group identifier and the second position to the non-AP initiator station, wherein the second position identifies a second data location for the second responder station in the single MU-MIMO transmission from the non-AP initiator station; and receiving the second position from the communications controller, wherein the second position is different from the first position;

forwarding, by the access point, a first direct link setup request message from the non-AP initiator station to the first responder station, the first direct link setup request message including the first group identifier and the first position; and forwarding, by the access point, a second direct link setup request message from the non-AP initiator station to the second responder station, the second direct link setup request message including the second group identifier and the second position.

14. The method of claim 13, wherein the first group identifier and the first position do not conflict with the second group identifier and the second position.

15. The method of claim 13, wherein the first group identifier and the first position are not already reserved for use with another responder station.

16. The method of claim 13, wherein the second group identifier and the second position are not already reserved for use with another responder station.

17. The method of claim 13, wherein the first group identifier request and the first position request are received in a single message.

18. The method of claim 13, wherein the first group identifier request comprises a first sequence number.

19. The method of claim 18, wherein transmitting the first group identifier comprises transmitting an acknowledgement if the first sequence number is a valid value.

20. The method of claim 18, wherein transmitting the first group identifier comprises transmitting an alternate value as the first group identifier when the first sequence number is not a valid value.

21. The method of claim 13, wherein the first group identifier includes a first time to live.

22. The method of claim 13, wherein the first group identifier request and the second group identifier request are identical.

23. A non-access point (non-AP) initiator station comprising:

a processor configured to select first and second responder stations for multiple-user multiple-input multiple output (MU-MIMO) transmission;

a transmitter operatively coupled to the processor and configured to:

transmit, from the non-AP initiator station to a communications controller, a request for a first group identifier for the first responder station and a request for a second group identifier for the second responder station; and request a first position for the first responder station and a second position for the second responder station from the communications controller;

a receiver operatively coupled to the processor and configured to:

receive, at the non-AP initiator station from the communications controller, the first group identifier for the first responder station, and the second group identifier for the second responder station; and receive the first position and the second position from the communications controller, wherein the second position is different from the first position; and the transmitter further configured to:

transmit, from the non-AP initiator station, a first direct link setup request message to the first responder station via an access point, the first direct link setup request message including the first group identifier and the first position, transmit, from the non-AP initiator station, a second direct link setup request message to the second responder station via the access point, the second direct link setup request message including the second group identifier and the second position, and transmit, from the non-AP initiator station, data to the first responder station and the second responder station in a single MU-MIMO transmission, a first portion of the data intended for the first responder station labeled with the first group identifier and located in the first position, and a second portion of the data intended for the second responder station labeled with the second group identifier and located in the second position.

24. The initiator station of claim 23, further comprising a processor configured to select the first position for the first responder station, and to select the second position for the second responder station.

25. The initiator station of claim 24, wherein the first group identifier and the first position do not conflict with the second group identifier and the second position.

26. The initiator station of claim 24, wherein the first group identifier and the first position are not already reserved for use with another responder station.

27. The initiator station of claim 24, wherein the second group identifier and the second position are not already reserved for use with another responder station.

28. The initiator station of claim 23, wherein the transmitter configured to transmit the request for the first group identifier comprises the transmitter configured to transmit a group identifier request message with a first sequence number.

29. An access point comprising:

a receiver configured to receive, from a non-access point (non-AP) initiator station, a first group identifier request and a first position request for a first responder station selected by the non-AP initiator station for multiple-user multiple-input multiple output (MU-MIMO) transmission, and a second group identifier request and a second position request for a second responder station selected by the non-AP initiator station for MU-MIMO transmission; and requesting a first position for the first responder station from a communications controller; receiving the first position from the communications controller; requesting a second position for the second responder station from the communications controller; and receiving the second position from the communications controller, wherein the second position is different from the first position;

a processor operatively coupled to the receiver, the processor configured to select a first group identifier and the first position in a first group for the first responder station, and to select a second group identifier and the second position in a second group for the second responder station;

a transmitter operatively coupled to the processor, the transmitter configured to transmit the first group identifier and the first position to the non-AP initiator station for the first station, and to transmit the second group identifier and the second position to the non-AP initiator station for the second station, wherein the first position identifies a first data location for the first responder station in a single MU-MIMO transmission from the non-AP initiator station, and wherein the second position identifies a second data location for the second responder station in the single MU-MIMO transmission from the non-AP initiator station; and the receiver and transmitter further configured to:
    forward a first direct link setup request message from the non-AP initiator station to the first responder station, the first direct link setup request message including the first group identifier and the first position, and
    forward a second direct link setup request message from the non-AP initiator station to the second responder station, the second direct link setup request message including the second group identifier and the second position.

30. The access point of claim 29, wherein the first group identifier request comprises a first sequence number, and wherein the transmitter is configured to transmit an acknowledgement if the first sequence number is a valid value.

31. The access point of claim 30, wherein the transmitter is configured to transmit an alternate value as the first group identifier if the first sequence number is not a valid value.

\* \* \* \* \*